(Model.)
2 Sheets—Sheet 1.
J. B. WEBB.
DIAGRAM INSTRUMENT FOR ENGINES.
No. 265,198.
Patented Sept. 26, 1882.
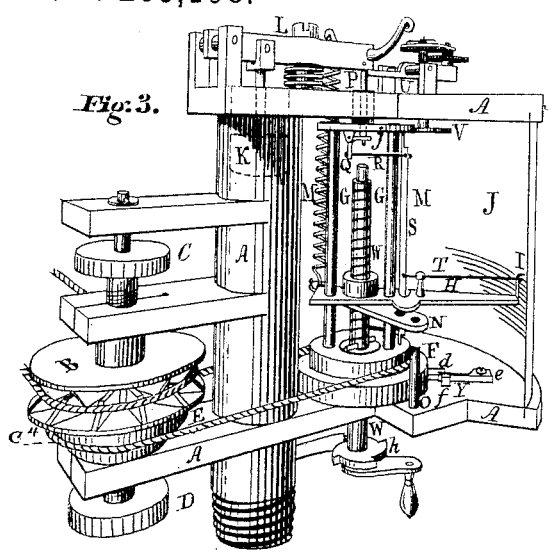
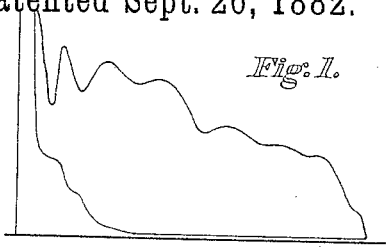
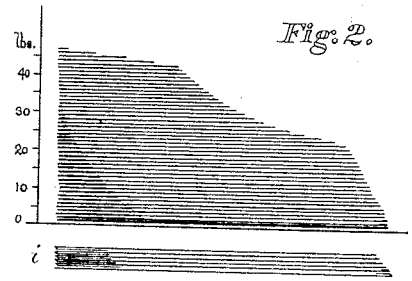
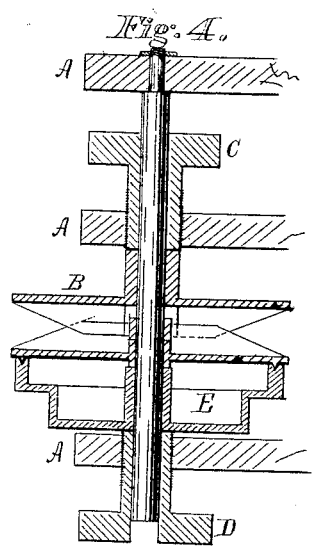
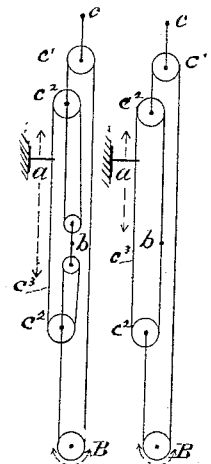
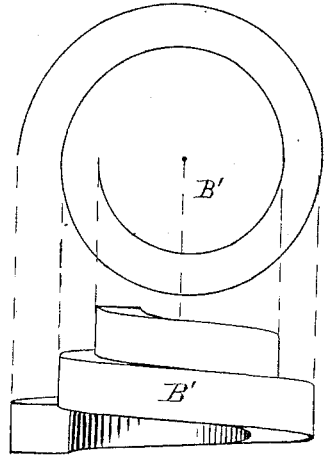
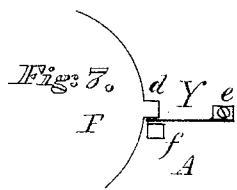
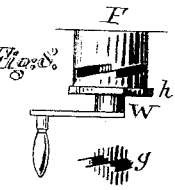
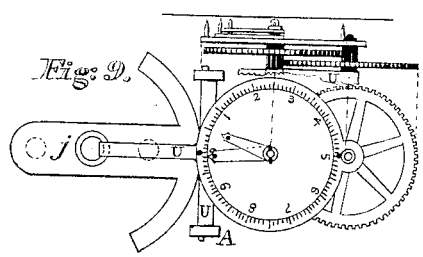
Witnesses:
Burkitt Webb
Chas R Webb
Inventor:
Burkitt Webb
N. PETERS, Photo-Lithographer, Washington, D. C.

(Model.)
J. B. WEBB.
DIAGRAM INSTRUMENT FOR ENGINES.
No. 265,198.
2 Sheets—Sheet 2.
Patented Sept. 26, 1882.
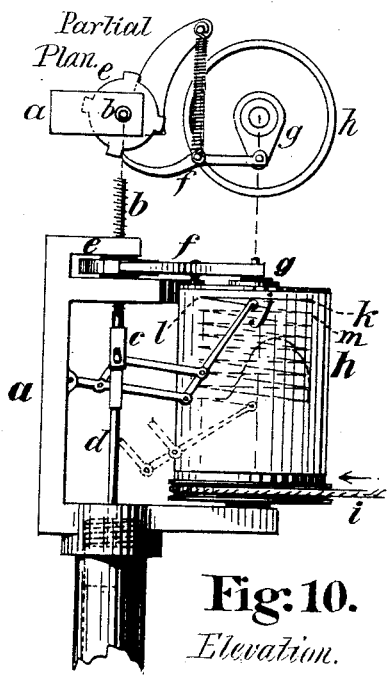
Fig. 10. *Elevation.*
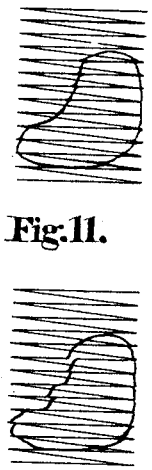
Fig. 11.
Fig. 12.
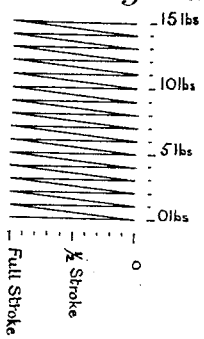
Fig. 13.
"Blank Diagram."
Witnesses: Alfred Gregory, J. F. Lillis
Inventor: J Burkitt Webb

UNITED STATES PATENT OFFICE.

J. BURKITT WEBB, OF ITHACA, NEW YORK.

DIAGRAM-INSTRUMENT FOR ENGINES.

SPECIFICATION forming part of Letters Patent No. 265,193, dated September 26, 1882.

Application filed July 21, 1882. (Model.)

*To all whom it may concern:*

Be it known that I, JOHN BURKITT WEBB, a citizen of the United States, residing at Ithaca, in the county of Tompkins and State of New York, have invented a new and useful Indicator, which has not been patented (nor patent applied for) in any foreign country, of which the following is a specification.

My invention relates to improvements in indicators such as are used for recording the periodically-varying pressure of a fluid contained in any vessel, as in the cylinder of a steam or other engine.

My improvements are, first and most important, an improved form of diagram and of the apparatus for describing the same, which enables me to render the accuracy of the former independent of the speed and of the friction of the moving parts; second, an attachment for automatically measuring and recording the area of the diagram during its formation; third, an apparatus for the systematic reduction of the stroke of the engine to the exact stroke required for the indicator; fourth, arrangements for conveniently stopping, starting, and adjusting the instruments. I attain these objects by the form of diagram and by the mechanism illustrated in the accompanying drawings, in which—

Figure 1 is a diagram taken from a high-pressure steam-engine with the present form of indicator. Fig. 2 shows the same diagram in my improved form. Fig. 3 is a perspective view of my indicator with its construction somewhat simplified, so as to emphasize the more important parts. Fig. 4 is an elevation in section of the driving mechanism, which is shown also in Fig. 3 to the left of the vertical column. Fig. 5 shows the method of reducing the stroke of the engine to some aliquot part of itself. Fig. 6 shows one form of the pulley for driving the instrument. Fig. 7 is a plan of one of the stops for limiting the motion of the indicator-pencil. Fig. 8 shows a flat ratchet or screw-collar arrangement for producing a jump-feed of the indicator-pencil. Fig. 9 is an enlarged view of the counter for automatically measuring the area of an indicator-diagram. Fig. 10 is an elevation, with partial plan, of an ordinary indicator furnished with an attachment to enable it to make my diagram. Fig. 11 shows my diagram as thus made. Fig. 12 shows a defective diagram. Fig. 13 shows my "blank diagram."

In Fig. 1 the diagram shown is of the usual form. The distance of any point of the curve from the vertical line represents the position of the piston of the engine, (and therefore the volume of steam,) while the distance of the point above the horizontal line should represent exactly the corresponding pressure of the steam. Owing to the momentum of the parts and to their friction, the pressure is not registered correctly, and the diagram is, in fact, worthless for high speeds. In the figure the effect of the oscillation of the pencil is quite marked.

In Fig. 2 my improved diagram is shown, which avoids these defects. The periphery of the semi-shaded portion is the curve of volume and pressure, and it is, in fact, the same curve as that in Fig. 1, but divested of the disturbances due to momentum and friction. The relation between this and the ordinary diagram can best be shown by describing the way in which an ordinary indicator can be used for taking my diagrams. The attachment necessary is shown in Fig. 10, and consists of an extension, $a$, of the frame of the instrument, a screw, $b$, connected by a slotted fork, $c$, with the piston-rod $d$ of the indicator, a ratchet-nut, $e$, working between the jaws of $a$ and operated by a pawl, $f$, and a crank, $g$, mounted on and fast to the oscillating drum $h$ of the indicator. Suppose, now, this instrument to be applied in the usual way to an engine. To operate it the piston must be drawn up against the spring (by throwing the pawl out of gear and revolving the nut) until the pencil $j$ is at the upper part of the paper, on $h$. The cock can now be opened between the indicator and cylinder, (back end,) and the cord $i$ connected with the cross-head of the engine. During the first forward stroke the horizontal or constant-pressure line $k\,l$ will be formed; but during the following return-stroke the pawl $f$ will feed the pencil down, and a diagonal or variable-pressure line $l\,m$ will result, then another horizontal and another diagonal, and so on down, forming the blank diagram, Fig. 13. With the cock shut the whole blank diagram would thus be formed, and the feed may be proportioned so that the horizontal lines will vary by one pound pressure, as indicated in Fig. 13.

(Any system of constant or variable pressure lines, or of both, sufficiently covering the paper would form a blank diagram. The zigzag pattern is, however, the most convenient.) With the cock open, however, and a maximum cylinder-pressure of, say, ten pounds, the nine-pound line will be followed only until the cylinder pressure has risen to that amount, when the piston will rise and the pencil will trace the upper part of the volume-and-pressure curve (exactly as in the indicator without the attachment) until the pressure falls again to nine pounds, when the pencil will again follow the nine-pound line to its end. The diagonal line will then be made, and, after commencing the eight-pound line, the pencil will again go off on the volume-and-pressure curve, but only to the nine-pound line, the slot in $c$ being made of the right length to stop it there. The pencil will then draw the previously-omitted portion of this line and descend from it on the opposite side of the volume-and-pressure curve to the eight-pound line, which it will then follow to its end. In this way, while drawing the blank diagram, the pencil will also mark upon it the volume-and-pressure curve, thus making a a complete card during successive strokes of the engine—a card, however, which represents the work of only one stroke. If the performance of the engine is gradually changing, this card will not represent any one actual stroke, but rather a mean of those required to form it. If the performance changes suddenly (from "priming" or otherwise) from stroke to stroke, we shall have a card like Fig. 12. In such a case an ordinary indicator would make a different curve for every stroke, the diagram looking like a skein of thread, and either card will show what the trouble is. The portion of the volume-and-pressure curve formed during each stroke is so small that its form is immaterial, so that it may be considered as simply a jog in the line. It will therefore be seen that my indicator is an instrument for producing a blank diagram by means of positive and exact mechanism, and of allowing only that the steam register upon each pressure-line the positions of the piston when the cylinder-pressure rises above and falls again below the corresponding amount. The blank diagram itself may be formed either in space or on paper. A horizontal motion and a vertical feed are sufficient for its formation. In Fig. 10 a third or "registering" motion is allowed by the slotted fork $c$. By making this registering motion at right angles to the paper, as in Fig. 3, we raise part of the blank diagram from the paper and form it in space just in front of the latter. (By suitable mechanism the remainder of it could be made in space, leaving only a row of dots, forming the volume-and-pressure curve.)

Fig. 3 shows one form of my indicator for producing this form of diagram. It may be described under the following subdivisions: I, the frame of the instrument; II, the driving mechanism; III, the diagram mechanism; IV, the measuring mechanism; V, the recording mechanism; VI, the area-counting mechanism, which will now be successively described.

I. The frame of the instrument, in the form shown in Fig. 3, consists of the various parts marked A, essentially in one piece. It must have the various projecting parts shown for the support of the working parts, besides which the vertical column has a screw-thread to facilitate the attachment of the instrument to the steam-cylinder, and its upper part is bored out to receive a piston, which receives the pressure of the steam. In place of the piston I employ, also, various forms of diaphragms.

II. The driving mechanism appears to the left of the hollow post, and also in sectional elevation in Fig. 4, while Fig. 5 shows the attachments for connecting this part of the apparatus with the engine cross-head. In the latter figure, $a$ is a piece projecting from the cross-head, and having, therefore, the same stroke. (Shown by a double-head dotted arrow.) $b$ is a fixed point, as also is $c$. B is the adjustable pulley of the driving mechanism, and, without further description, it is evident that such an arrangement of cords $c^3$ and pulleys $c'$ and $c^2$, two forms of which are shown, must cause B to oscillate with a positive motion, the cord passing around B having a travel equal to some aliquot part of the stroke of the cross-head. The reduction of this travel to the exact arc of oscillation required by the indicator is the function of the adjustable pulley B. Another method of connection with the cross-head may be employed, as the indicator can be so arranged as to work with different arcs of oscillation; but I prefer the method of Fig. 5, as giving a positive motion with a minimum weight of the moving parts. B is the well-known pulley, whose size depends on the degree of approximation of its two disks. The lower of these is fastened to the shaft, which has long (and therefore durable) bearings in the screws C and D, and also a shoulder running in the frame A, which will sustain an end-thrust of the shaft. The upper part of B slides on the shaft, for adjustment of the size of the pulley, by means of the screw C. The adjustment can therefore be made while B is in motion, the cord pulling into the V-notch, (or groove,) keeping the upper disk against the screw. The cone-pulley E completes this part of the apparatus. It has a groove to receive a projection on the lower disk of B, but turns freely on the shaft unless the groove and projection are forced together by the screw D, when E oscillates as a part of B. The adjustable pulley can be made in other forms—as, for instance, on the principle of a flat-scroll chuck. One other form is, however, adapted to the requirements of the apparatus. In this form the surface of B is made in the form of a logarithmic spiral, as shown in Fig. 6, where an elevation and plan of the surface only of the pulley are shown. It is clear that by moving $b$ any desired portion of B' can be brought into action. The length of the arc will of course remain equal to the throw of the cord, but the moving of $b$ will make the average radius (of the arc of the surface of B') such that the right amount of oscillation will be given to the parts connected with B'—i. e., the angular oscillation of B' can be made the right amount for the indicator. The same end can be accomplished by a simple frustumed cone-pulley of small angle, furnished with guide-rollers to cause the cord to run in any desired place on it; but this arrangement would not be so compact. The logarithmic spiral pulley introduces a slight error into the velocity ratio. This can be corrected in various ways, as by setting the receiving-surface J slightly eccentric, or forming its surface also into a logarithmic spiral and allowing the describing point to spring sufficiently to allow for the varying radius, also by making either E or F in the form of a logarithmic spiral, or by making both E and F in that form, or by mounting F separate from the other oscillating parts, making it slightly eccentric to those parts with which it now revolves, and connecting it with them by a pin and slot after the manner of the quick return motion used in shaping-machines—in fact by various forms of mechanism of the same general characters as are those suggested. The screw D being lowered, the pulley B may be run continuously, while the indicator itself need only be started and run whenever an indicator-card is to be taken. This has the great advantage of bringing the principal wear on a comparatively unimportant part of the instrument. Were it not for this, the pulley B might occupy the place where F now is, the adjusting and stopping and starting mechanisms being somewhat differently arranged.

III. The diagram mechanism consists of a concave (or other) receiving-surface J—in fact the ordinary convex cylindrical surface (actuated by a cord and spring, or stationary) may be employed—before which a registering-point, I, is oscillated and at the same time cross-fed. This point has also a third or registering motion perpendicular to the surface J. Any of these motions may of course be given to the surface J instead of to the point I. H is the diagram-arm, which carries the point I, to allow I to move against and away from the paper. The attachment is made with a spring, which bends sufficiently for the purpose. H slides up and down on a vertical guide (two vertical rods, G) fastened to the pulley F, and forming with the pulley and a piece connecting the guides at the top a frame, which oscillates on two hollow journals (which are a part of it) in the main frame A. The oscillation of this frame is effected by the belt connecting F with E, and it is limited by two spring-stops, Y Y, (one not visible,) fastened to the main frame. One of these stops is shown in Fig. 7. $f$ is a projection from the frame A, and $e$ is a spring screwed to A. $d$ is a projection from F.

When the proper arc of oscillation is secured $d$ will strike $e$ at each stroke, but will not force it back quite to $f$. When the oscillation would otherwise be too great $f$ checks it, and thus keeps F vibrating correctly until (by the screw C) the oscillation of B is sufficiently reduced, which is known by the contact of $d$ occurring with $e$, but not with $f$. The "blank diagram," as it may be called, is therefore a rectangular (or other) space ruled with parallel lines whose length is regulated by the stops Y Y. It is not necessary that these lines should be of a fixed length. The stops may be adjustable, in which case a suitable ratchet must be used on the feed-screw W. This feed-screw, belonging at once to the diagram and to the measuring mechanism, passes through the lower hollow journal of the piece F G, and a spring-washer causes enough friction to make the screw oscillate with F G unless forcibly prevented. It is, in fact, allowed to do so in one direction, while a spring-catch, which engages the ratchet at its lower end, holds it stationary with reference to A during the return-stroke, thus accomplishing a feed of the nut which is formed in H. By withdrawing the spring-catch the nut may be screwed down again, so as to bring the point to the bottom of the diagram, where it is placed at the beginning of an experiment. Instead of connecting W with F by friction, a ratchet and catch may be used. Instead of the gradual feed during the return-stroke thus given, I sometimes employ other arrangements. This feed makes a diagram, as shown in Fig. 2, where the return lines are but little separated from the main lines, and parts of them are shown thickening the main lines of the diagram. The return lines are, in fact, diagonals connecting the ends of neighboring parallel lines, and are not strictly lines of constant pressure. The feed can be made sudden at the end of the return-stroke by the arrangement of Fig. 8. Here $h$ is the ratchet on the lower end of the screw W, and on its upper surface is formed a flat ratchet or partial screw-thread of the same pitch as the screw. This engages another similar one formed on the lower end of the journal (projecting from F) of the oscillating piece F G. The two together take the place of the ordinary collar of the screw W, (which cannot be seen in Fig. 3.) During the greater part of the return-stroke the feed will be thus neutralized by this flat ratchet. The position in Fig. 8 is near the end of the return-stroke. Just at the end, however, the points of the ratchets slip past each other, and the nut is suddenly fed. By making the step or point of the ratchet double the diagram, as shown at $i$, Fig. 2, can be made with constant-pressure lines for the return-stroke, lying midway between the direct lines. The single-step ratchet-washer gives constant-pressure return-lines coinciding with the direct lines. The double step is sketched at $g$, Fig. 8. Instead of feeding by a screw, it can be accomplished by a rack and escapement, or the screw may be used as a rack. The thread of the screw may also be made of such a shape as to accomplish the jump-feed without the flat ratchet. In this case it will hardly be a screw, but simply a cylinder with zigzag or other shaped grooves on its surface, with a point or properly-shaped piece (instead of the nut) to work in the groove. The arrangement of the lines of the diagram shown in Fig. 2, *i*, can also be accomplished independent of the feed by causing the describing-point to assume a slightly-different position on H when the motion of H is reversed. This can be accomplished in various ways, the simplest of which is to allow I a little motion and give it a slightly diagonal point or edge, whose friction against J will throw it into a different path during the return-stroke. The point I may also be actuated by connecting it with some other piece made to rub against a second surface (provided for the purpose) concentric with the diagram-axis in such a way that the friction shall give it a different position during the return-stroke from that which it has during the forward oscillation. The point itself can otherwise be formed slightly hooked, so that the line formed in one direction will be of a different character (broader or heavier, say) from that formed in the other direction, and this device is the simplest of all, giving a diagram like the first in Fig. 2, with the boundary between the heavy and half shading sufficiently pronounced.

IV. The measuring mechanism resembles in some respects a spring safety-valve. It has a piston or diaphragm, K, to receive the pressure of the steam. This acts on the lever L, held down by two springs, M M, one of which is removed to show other parts, the designating-letter, however, remaining in its proper place. The upper ends of the springs, being attached to two symmetrical (with respect to W or to the diagram-axis of the instrument) horns projecting from L, have their lower ends fastened to opposite ends of a cross-piece, which rests against the lower side of H, so that the tension of the springs pulls H up when the feed of the screw allows. This arrangement accomplishes the setting of the springs to a series of pressures corresponding with the lines of the diagram. Of course, when the steam overcomes the springs L rises, and the pressure is thus measured. The screw seen at L is for the limitation of the movement of the lever to a small and definite amount. Under this is seen a spring acting under compression. Its object is to oppose the other springs sufficiently that they may remain under tension when the pressure falls below atmospheric pressure. A stop (not shown) prevents the fall of the lever below the proper point, as shown in Fig. 3. The vertical pin *o* (broken off) runs through a third hole in the cross-piece and prevents any oscillation being caused by the friction of H. A fourth hole, midway between those for the attachment of the springs, allows the passage of the screw W. The interposition of the lever L is not a necessary feature of the instrument. The springs can be made to act directly on a cross-piece attached to the piston-rod or diaphragm. I prefer, however, to use springs under tension, and I employ two springs rather than one, for various reasons. An important advantage which they have is that they may be made as nearly of the desired strength as possible, and then paired to obtain an exact sum, whereas a single spring must be much more accurately made. The record of the position of the piston at each rise or fall of the lever L is made by—

V. *The recording apparatus.* This consists of any convenient train of mechanism, connecting the lever L and the point I in such a manner as to be unaffected by the oscillation and feed of the latter. That shown in Fig. 3 consists of a vertical pin, P, passing through the hollow upper journal of F G exactly in the diagram-axis, and compelling the bell-lever Q to follow the motion of L. The rod R communicates this motion, further, to the vertical leaf or flap S, which is mounted in F G, so as to oscillate slightly about an axis parallel to the diagram-axis (or axis of W.) Against the edge of this leaf rests the hooked end of the rod T, which is mounted on H, and which therefore draws back the point I whenever L falls, and allows it to spring against J when L rises. It is thus clear that the beginning of each line of the diagram indicates the position of the piston when the steam rises above the pressure corresponding to that line, while the end of the line indicates its position when the pressure falls below that amount. The length of the line, therefore, indicates the time or portion of the stroke during which the pressure was above that amount, and the sum of all these lengths will be seen to give the area of the diagram, and therefore the work done by the piston. I employ various other means of connecting L with I, one of which is a cord passing over pulleys, one of which is movable and acted on by L, leaving the two ends of the cord attached to H, (and parts connected with and moving with it,) so that the feed of H does not affect the transmission of the motion from L to I. In order to make the instrument register the area of the diagram during its formation, which is quite desirable, the addition of—

VI. The area-counting mechanism is necessary. The cross-piece *j*, connecting the upper ends of the vertical rod-slides G, and having formed on it the upper hollow journal for F G, has a portion of its periphery concentric with the diagram-axis; and the area-counting mechanism is a contrivance (quite ordinary) for measuring the passage of this concentric surface in one direction during the formation of the diagram. The principle is that by which the blacksmith measures the length of a tire by a freely-rolling wheel of known periphery mounted in a frame. The measuring-wheel is V. Its shafts runs in bearings (which project through a hole in A) on the rocking frame U. This frame rocks in supports projecting from A, and has a projection which engages L and causes U to rock with it. Evidently when L rises the weight of U (or a spring, if necessary) will cause it to descend, and V will engage $j$ at the same instant that I touches J, leaving it again when I leaves J. Thus V will measure the total length of the lines of the diagram, which length it remains simply to register. This is done by the two pointers shown moving over a dial divided into one hundred parts. The wheels and pinions above cause one pointer to move one hundred times slower than the other, entirely after the manner of reducing the motion of the minute-hand to that of the hour-hand in a clock. One additional feature of this mechanism deserves notice. To provide for self-registration of the area, I place on the graduated dial two points (or more) and on each hand (or pointer) a point. These points terminate in the same plane, and are sufficiently sharp that by pressing a paper down on them an impression of their position is made, and thus the area is registered. Fig. 9 shows a plan (and elevation of the dial, points, and paper) of this arrangement on a larger scale. It is evident that by an arrangement for quickly manipulating the paper the record can be made, if desirable, while the hands are in rapid motion.

What I claim, and desire to secure by Letters Patent, is as follows:

1. An indicator-diagram formed of substantially horizontal lines, which by interruption or deepening define the volume and pressure register line, substantially as specified.

2. An indicator in which a recording-point is by the motion of the piston caused to pass over a recording-surface to form diagram-of-pressure lines, and by suitable feed mechanism has its position with reference to said lines regularly changed, and by means of the pressure of steam within the cylinder is moved toward and caused to impinge upon said recording-surface, substantially as shown.

3. As a means for adjusting the indicator to engines having different lengths of stroke, the combination, with the adjustable pulley B, of the stationary pulley $c'$ and movable pulleys $c^2$, placed between and adapted to receive the operating-cord $c^3$, substantially as set forth.

4. In combination with the vibrating frame which carries the recording-point, the spiral pulley B', adapted to receive the driving-cord $c^4$, substantially as shown and described.

5. As a means for causing the recording-point to impinge upon the recording-surface, the diaphragm K, lever L, and springs M M, in combination with intermediate mechanism substantially as specified.

6. As a means for recording the exact area at any given time, two fixed points arranged upon opposite sides of a properly-divided circular dial, two points provided respectively upon the ends of a long and a short hand, which are adapted to travel around said dial, the first to indicate thereon each movement of the recording-point and the latter to indicate several of such movements, and means whereby a paper blank may be simultaneously pressed upon and removed from each of said points, substantially as shown.

J. BURKITT WEBB.

Witnesses:
BURKITT WEBB,
CHAS. R. WEBB.